United States Patent
Noga

(10) Patent No.: US 11,147,263 B2
(45) Date of Patent: Oct. 19, 2021

(54) FISHING LIGHT

(71) Applicant: Rebecca Noga, Edgewater, FL (US)

(72) Inventor: Rebecca Noga, Edgewater, FL (US)

( * ) Notice: Subject to any disclaimer, the term of this patent is extended or adjusted under 35 U.S.C. 154(b) by 0 days.

(21) Appl. No.: 15/917,751

(22) Filed: Mar. 11, 2018

(65) Prior Publication Data
US 2018/0192631 A1     Jul. 12, 2018

Related U.S. Application Data

(63) Continuation-in-part of application No. 15/265,725, filed on Sep. 14, 2016, now abandoned.

(51) Int. Cl.
| | | |
|---|---|---|
| *A01M 29/10* | (2011.01) | |
| *F21V 23/04* | (2006.01) | |
| *A01K 97/00* | (2006.01) | |
| *A01K 85/01* | (2006.01) | |
| *F21K 9/20* | (2016.01) | |
| *A01K 97/02* | (2006.01) | |
| *A01K 79/02* | (2006.01) | |
| *A01K 79/00* | (2006.01) | |
| *H05B 47/19* | (2020.01) | |
| *H05B 47/155* | (2020.01) | |
| *F21Y 115/10* | (2016.01) | |
| *F21Y 103/00* | (2016.01) | |
| *F21Y 107/30* | (2016.01) | |
| *F21Y 113/13* | (2016.01) | |

(52) U.S. Cl.
CPC ............. *A01M 29/10* (2013.01); *A01K 79/00* (2013.01); *A01K 79/02* (2013.01); *A01K 85/01* (2013.01); *A01K 97/00* (2013.01); *A01K 97/02* (2013.01); *F21K 9/20* (2016.08); *F21V 23/0407* (2013.01); *H05B 47/155* (2020.01); *H05B 47/19* (2020.01); *F21V 23/0435* (2013.01); *F21Y 2103/00* (2013.01); *F21Y 2107/30* (2016.08); *F21Y 2113/13* (2016.08); *F21Y 2115/10* (2016.08)

(58) Field of Classification Search
None
See application file for complete search history.

(56) References Cited

PUBLICATIONS

The Q&A section of the Gator-Tough shrimp light webpage (published Mar. 3, 2017) (Year: 2017).*

* cited by examiner

*Primary Examiner* — Bryon T Gyllstrom
(74) *Attorney, Agent, or Firm* — Quickpatents, LLC; Kevin Prince

(57) ABSTRACT

A submersible lantern is anchored to the sea floor and kept upright by a float and a countersink weight. The lantern emits multiple patterns of green and white light at specific frequencies and intensities that repel catfish while causing shrimp to surface. The lantern has an elongated body, and includes a float and weight to vertically orient the lantern underwater so that it emits light 360 degrees around the lantern body. A push button switch along with a PCB board cycles the lights and power level to the lights based on the particular application. A wireless circuit is used for remote operation via a mobile phone or other wireless device. The lantern can be used both in the sea and on land, and includes a two-part power connector to connect to various conventional power sources.

11 Claims, 7 Drawing Sheets

| Power | 40w | 50W | 100W | 150W | 200W | 300W |
|---|---|---|---|---|---|---|
| Light Length | 12.5cm | 12.5cm | 20.3cm | 26.7cm | 33.9cm | 48.5cm |
| LED qty | 216 PCS | 120 pcs | 240 pcs | 360 pcs | 480 pcs | 720 pcs |
| LEDs/ Lumens | Green 2200 White 1700 | Green 3840 Yellow 1200 White 6360 | Green 7680 Yellow 2400 White 12720 | Green 11520 Yellow 3600 White 19080 | Green 15360 Yellow 4800 White 25440 | Green 23040 Yellow 7200 White 38160 |
| Input | DC 12-24V | DC 12-24V | DC 12 or 24V | AC 100-240V | DC 12 or 24V | AC 100-240V | DC24V | AC 100-240V | DC24V | AC 100-240V |
FIG. 8
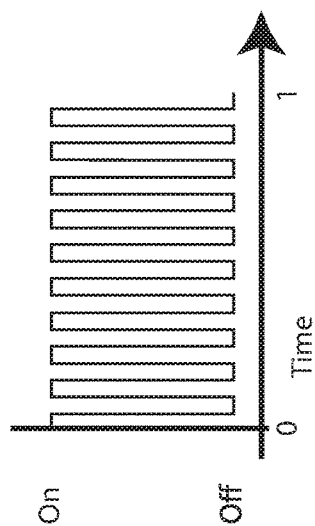
FIG. 9
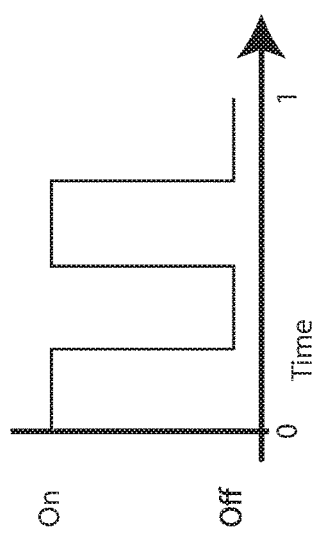
FIG. 10
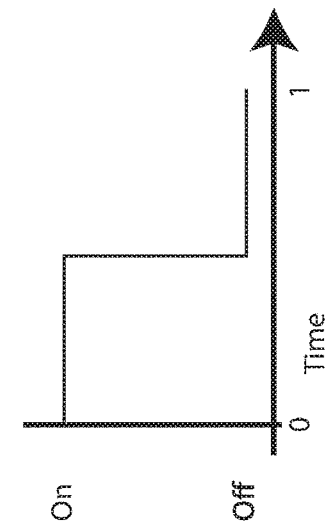
FIG. 11

FISHING LIGHT

CROSS-REFERENCE TO RELATED APPLICATIONS

This application claims the benefit of U.S. Utility patent application Ser. No. 15/265,725, filed on Sep. 14, 2016, and incorporated herein by reference.

STATEMENT REGARDING FEDERALLY SPONSORED RESEARCH AND DEVELOPMENT

Not Applicable.

FIELD OF THE INVENTION

This invention relates to lanterns, and more particularly to fishing lanterns to improve catching shrimp, fish and bait.

DISCUSSION OF RELATED ART

Shrimp avoid light and therefore must be caught at night. Lanterns to allow anglers to see shrimp for fishing at night commonly comprise a light that lays on the sea floor. These lights typically have an elongated body with an electric cable attached at one end with the other end of the cable long enough to run up to a boat or other vessel. Such common lights limit the amount of shrimp that can be viewed because the light sinks to the sea floor and lays on its elongated side which only emits light at about 180 degrees. Fish are also attracted to light sources since light sources attract other organisms that fish eat.

However, it has been found that strobe lights of particular frequencies and colors are helpful not only to attract shrimp to the surface of the water, but also to repel predators such as catfish. Catfish and other predators routinely interfere with shrimping and are a nuisance to fishermen.

Therefore, there is a need for a device that provides a maximum light and accompanying viewing capability. Such a needed invention would allow anglers to see more shrimp by emitting light about 360 degrees. Further, such a needed invention would allow for a wide variety of light colors and flashing/intensity patterns, and could also be used for above-water applications such as a lantern, a boat navigation or bow light, and other uses. In particular such a needed invention would include light color and strobe frequency combinations particularly well-suited to the capture of shrimp. The present invention accomplishes these objectives.

SUMMARY OF THE INVENTION

The present device is a submersible lantern that, in one use, is anchored with a weight to the sea floor. The lantern emits multiple colors of light such as green and white dependent on a user's specific application, and certain strobe frequencies that are particularly effective at "boiling" shrimp while repelling catfish are pre-programmed into the device. Further the present device has a float to ensure the lantern is in a vertical orientation, maximizing the amount of light produced in a body of water so as to promote catching of the maximum amount of shrimp or the like.

The lantern consists of an elongated body with lights surrounding the body and a first and second end cap. The first end cap has as an electric cable to provide an electrical current to the light. The first end cap also has a mounting structure for attaching a weight which will lay on the sea floor in some applications. The second end cap has a mounting structure for attaching a float to ensure the lantern orients in an upright vertical position, and may be used in conjunction with a counterweight that is fixed with the mounting structure of the first end cap to ensure the vertical orientation of the lantern. A switch is integrated in the cable to cycle between multiple light patterns or illumination modes, as well as to vary the intensity of the lights.

In other embodiments the lantern has a wireless circuit to remotely control the lights via a wireless network such as with a mobile phone, laptop or other wireless device. In such an embodiment, an antenna is included proximate the switch for use above the water for optimal reception.

It has been found that such a flashing pattern is particularly well suited for repelling catfish and causing shrimp to rise to the surface of the water, with a flashing frequency between 2 hz and 2.67 hz having extraordinary results. At about 2 hz shrimp "boil" to the surface of the water to facilitate capture, and at about 2.67 hz catfish are effectively repelled from the area surrounding the lantern. The present device includes these preset frequencies. Other features and advantages of the present invention will become apparent from the following more detailed description, taken in conjunction with the accompanying drawings, which illustrate, by way of example, the principles of the invention.

DESCRIPTION OF THE DRAWINGS

FIG. 8 is a chart showing lumen output in a preferred embodiment of each color of LED based on wattage;

FIG. 9 is a timing chart showing a strobe frequency of 1 hz, the lower end of the preferred range;

FIG. 10 is a timing chart showing a strobe frequency of 2 hz, a substantially optimal frequency for shrimping and catfish repelling; and FIG. 11 is a timing chart showing a strobe frequency of 10 hz, the upper end of the preferred range.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
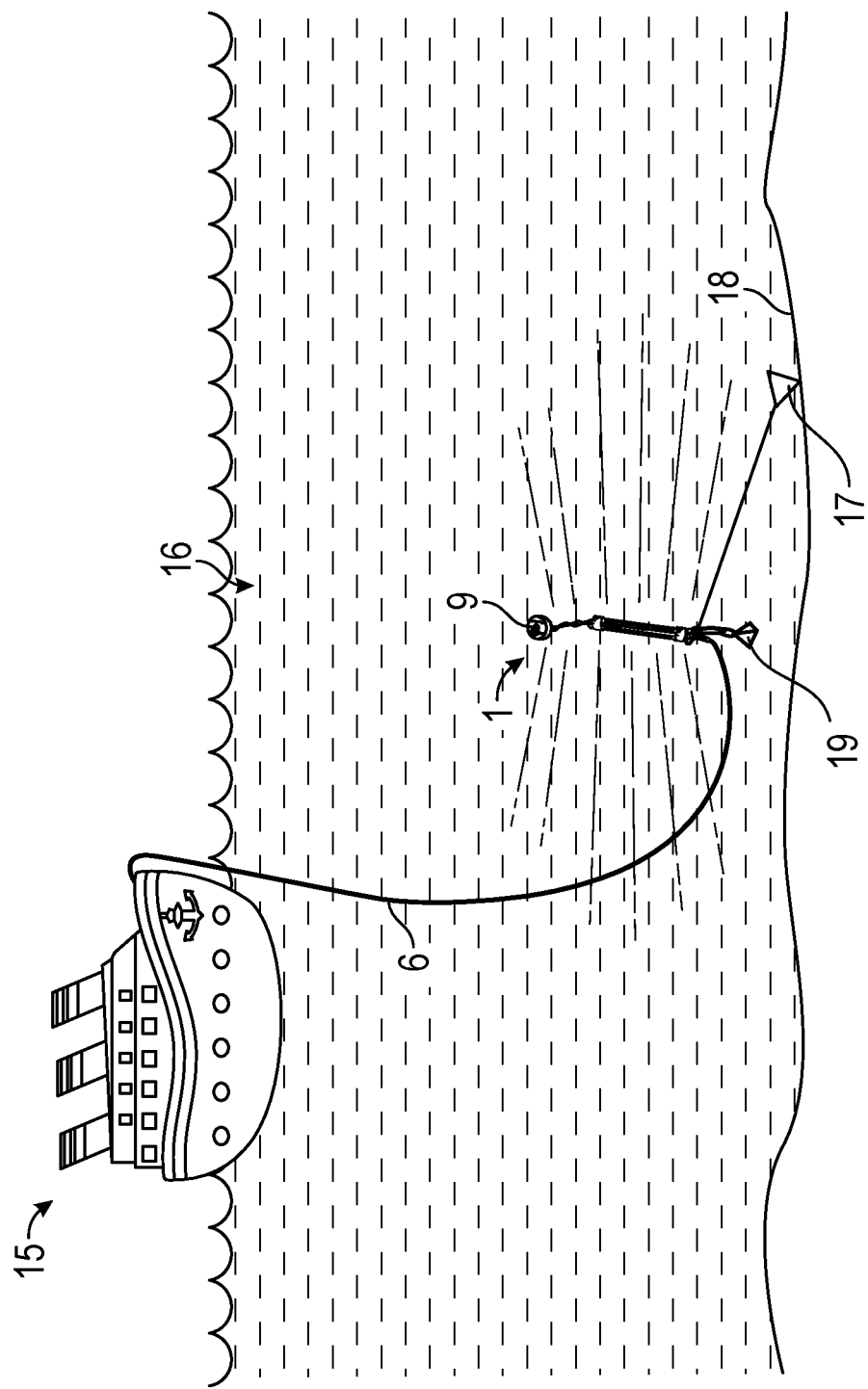
FIG. 1 is a diagram of the lantern used in commercial and recreational fishing and shrimping.

FIG. 1 illustrates a waterproof lantern 1 useful in the commercial shrimp and fishing industries. The lantern 1 is placed into the water 16 for the shrimp to see at night. The lantern 1 has at a first end, a flexible water proof electric cable 6 fixed at the first end and that extends to a boat 15, pier or other above-water structure. Attached to the first end of the lantern 1 is a weight 17 that anchors the lantern 1 to the sea floor 18. Preferably the weight 17 is fixed to the lantern 1 with a cable or cord of more than 10 feet at the first end.

Additionally, a first end cap 3 has a mounting bracket 5 for a clip 14 to attach to a counter-weight 19 for maintaining a generally vertical orientation of the lantern 1 underwater in cooperation with a float 9. Such a counter-weight 19 may be any of a variety of weights available in the marketplace of sufficient weight to orient the lantern 1 vertically but not to overcome the float 9 and cause the lantern 1 to sink to the sea floor 18. The clip 14 is also the attachment point for the anchor rope with weight 17 that rests on the sea floor 18.

Figure 2:
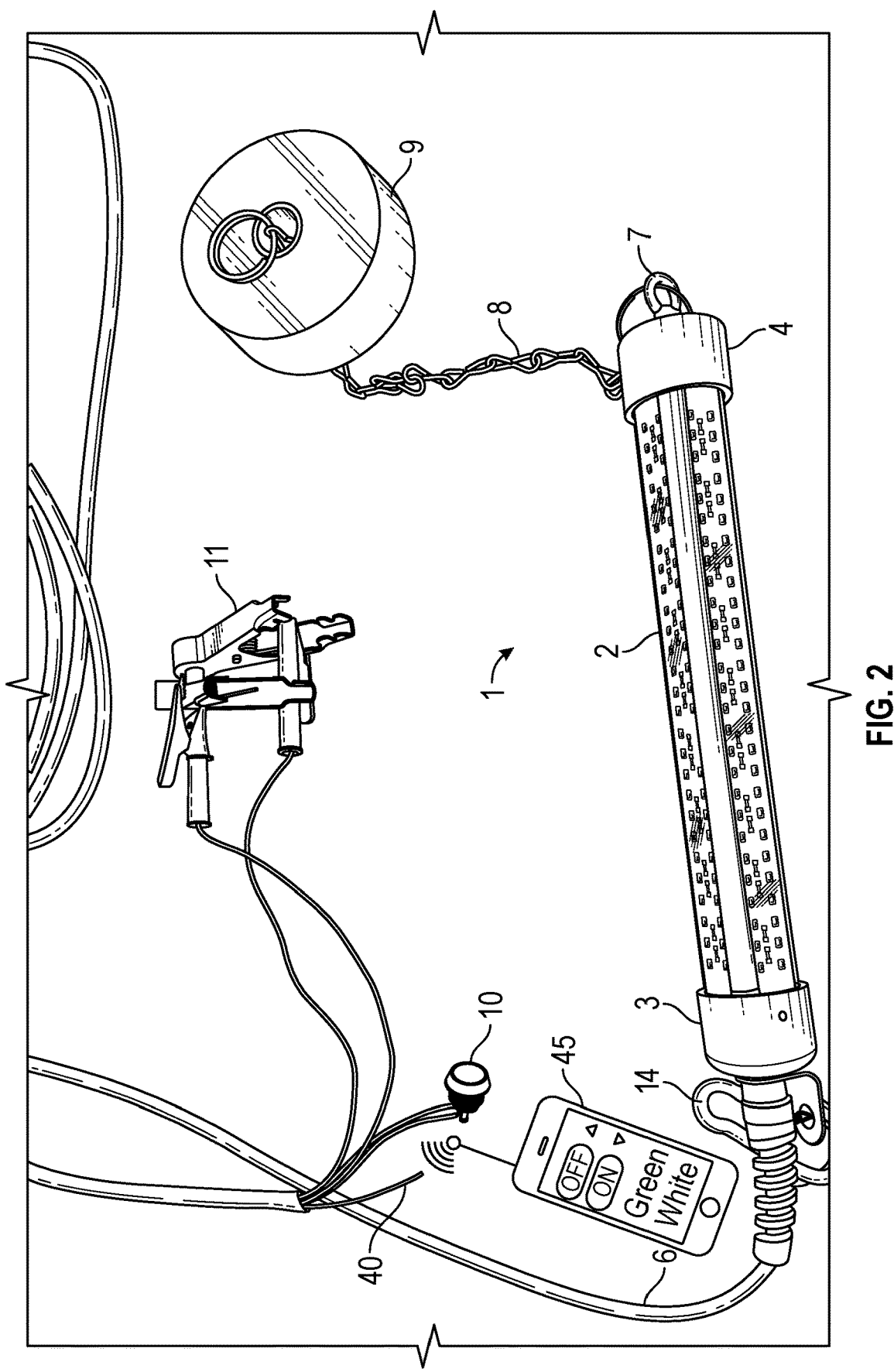
FIG. 2 is a diagram showing the lantern, lantern mounts and an electrical cable terminating at a switch and battery clips.

FIG. 2 illustrates the lantern 1 having an elongated body 2, the first end cap 3 and a second end cap 4. Each end cap 3,4 is sealed from water leaks using acrylic glue, or the like. The first end cap 3 with the mounting bracket 5 (FIG. 3) for the clip 14 may also be used to attach the weight 17 to the lantern 1 via a rope or chain. Additionally, a counter sink weight 19 is added when the float 9 is attached to the lantern 1 to orient the lantern 1 in a vertical, upright position even in strong currents.

The second end cap 4 has a mounting structure 7 to attach a line 8 to the float 9. The mounting bracket 5 may be attached to the first end cap 3, or may be integrally formed with end cap 3 in an injection molded plastic operation. Likewise, the mounting structure 7 may be attached to the end cap 4 or integrally formed therewith. The electric cable 6 is attached at one end to the first end cap 3 of the elongated body 2.

Figure 6:
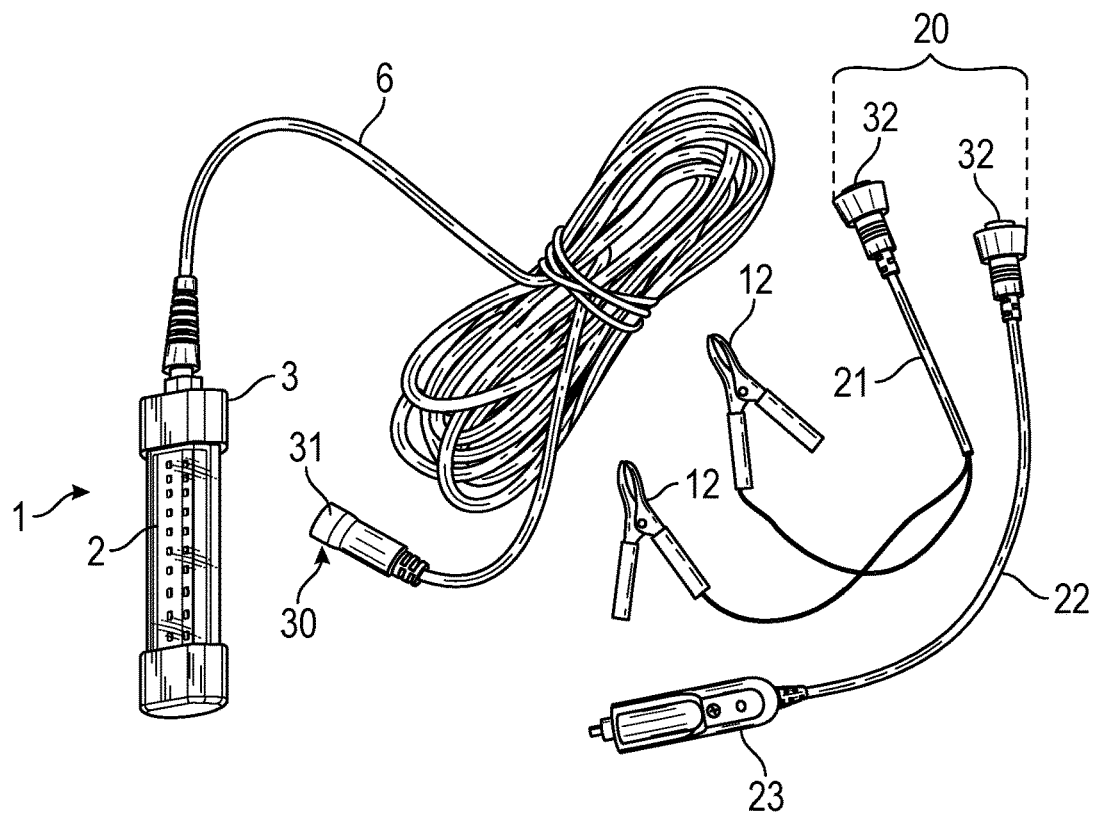
FIG. 6 is a diagram showing a two-part electrical connector and two mating power adapter cords therefore.
Figure 7:
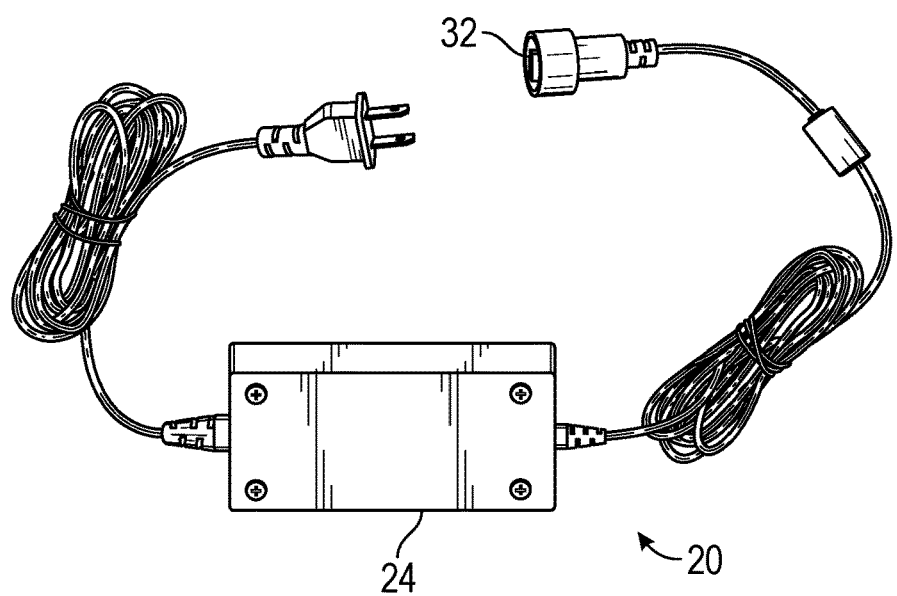
FIG. 7 is a diagram showing an AC Adapter and a second part of the two-part electrical connector.

The other end of the cable 6 has a push button switch 10 and a first part 31 of a two-part electrical connector 30 (FIGS. 6 and 7) that may be fixed to an adapter 20 that adapts to a particular type of power source. For example, a battery clip adapter 21 includes a second part 32 of a two-part electrical connector 30 electrically connected to battery clips 12 that may be attached to electrodes of a conventional 12 volt battery (not shown), or a rechargeable battery (not shown) such as a lithium rechargeable battery. A cigarette lighter adapter 22 includes the second part 32 of the two-part electrical connector 30 electrically connected to a cigarette lighter plug 23 for insertion into a 12-volt car or boat cigarette lighter receptacle (not shown). An AC adapter 24 includes the second part 32 of the two-part electrical connector 30 for converting a 110-240 v AC power source to 12 volts DC. In one simplified embodiment, the electrical cord terminates at the battery clips 21 and does not include the two-part electrical connector 30 (FIG. 2).

Figure 3:
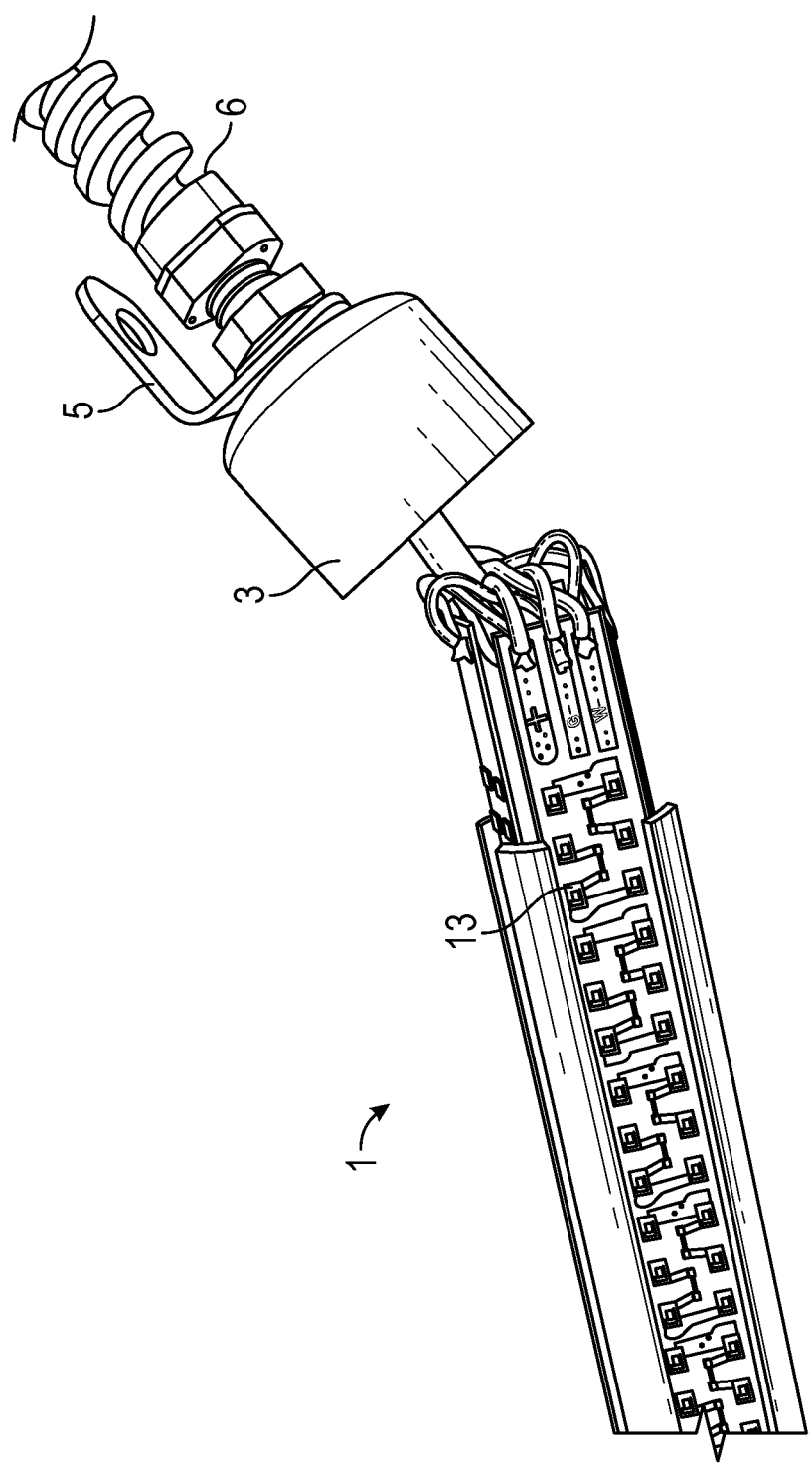
FIG. 3 is a partial diagram showing the lantern and first end cap separated.
Figure 4:
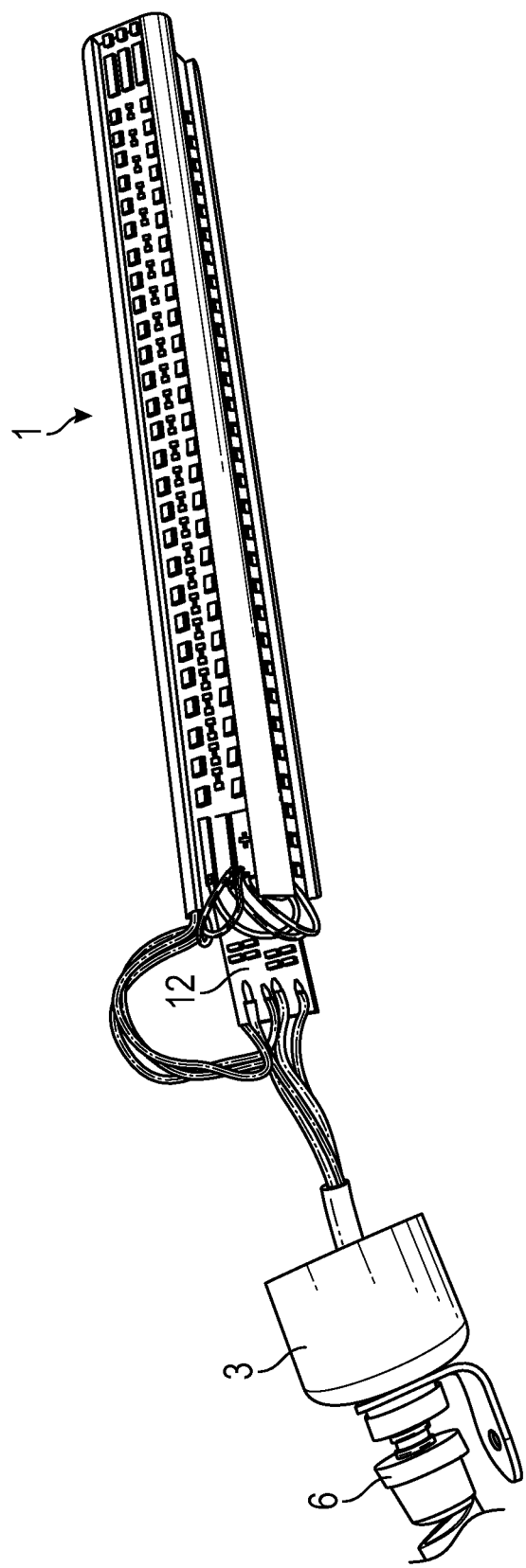
FIG. 4 is a partial diagram showing the PCB board partially inserted into the lantern.
Figure 5:
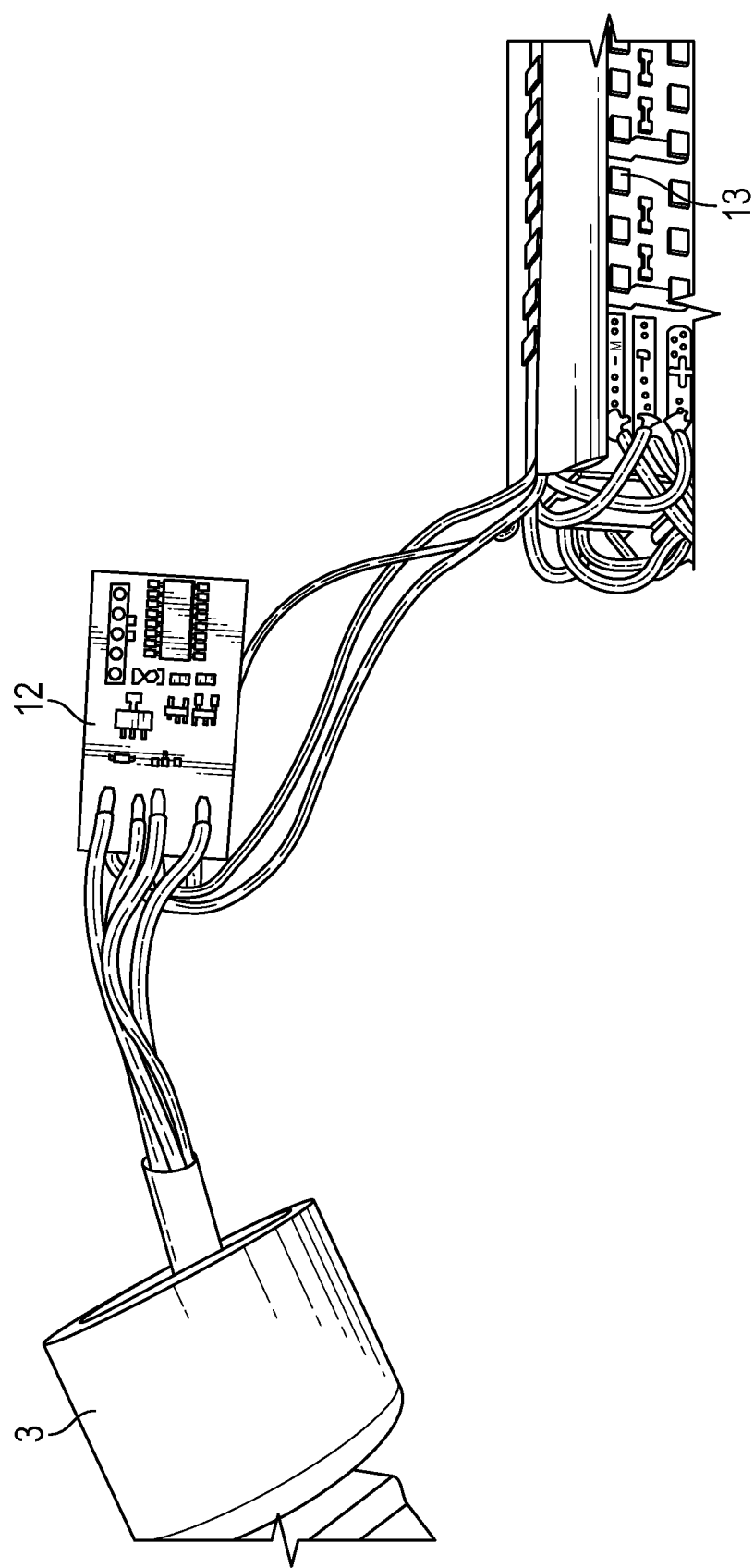
FIG. 5 is a partial diagram, showing the first end cap, PCB board and lantern.

FIG. 3 illustrates the illumination means which are preferably light emitting diodes 13 (LEDs) for the lantern 1. These emit different colors of light which are preferably green and white. FIGS. 4-5 illustrate a printed computer board (PCB) 12 to control and program the selection and power to light emitting diodes 13.

The push-button switch 10 along with the PCB 12 activates the illumination means to cycle between various illumination modes, preferably up to 11, such modes including green and white full power, green only, white only, green and white half power and flashing green and white. The PCB 12 is programmed to cycle between several light and intensity patterns with each closing of the switch 10.

For example, green lights and white lights at full power is a program for deep water use, and constitutes a bait and shrimp attracting function. Green-lights-only is a submersible bait-attracting function. White-lights-only is for submersible and land/boat navigation use, providing a dual purpose program. As such the lantern 1 can be fixed with a light pole of the boat (not shown) or a post of the pier (not shown) to illuminate the surrounding area. Yellow LEDs may be added for a softer while light. Green lights at half power and white lights at half power is a lower-intensity program for use in shallow water for shrimping and bait attraction. The number of illumination modes is not necessarily limited to those listed herein.

In some embodiments suitable for shrimping, the flashing green and white mode flashes the green and white LEDs at a frequency of between 1 hz and 10 hz at between 50-300 W. Such flashing is preferably split between on and off durations, so that, for example, a 2 hz cycle will power the green and white LEDs for 0.25 second, then off for 0.25 seconds, then on for 0.25 seconds, and then off again for 0.25 seconds.

It has been found that such a flashing pattern is particularly well suited for repelling catfish and causing shrimp to rise to the surface of the water, with a flashing frequency between 2 hz and 2.67 hz having extraordinary results. At about 2 hz shrimp "boil" to the surface of the water to facilitate capture, and at about 2.67 hz catfish are effectively repelled from the area surrounding the lantern 1. The green LEDs, when powered, preferably produce between 3,000 and 24,000 lumens, while the white LEDs, when powered, preferably produce between 1,700 and 39,000 lumens. In some embodiments yellow LEDs are included and, when powered, produce between 1,000 and 8,000 lumens. The lantern 1 can be used either when submerged in water or not submerged in water, the switch 10 including a setting for powering the white LEDs and the yellow LEDs when the lantern 1 is not submerged to provide on the order of 1,000 lumens of a warm white light. In some modes, all white, green and yellow LEDs are illuminated together.

In some embodiments the PCB board 12 further includes a wireless circuit to communicate with a wireless network of a mobile phone 45, such as a WiFi or similar network (FIG. 2), or other mobile computer for remote operation, or with a direct wireless connection as with a Bluetooth or similar protocol. The wireless circuit has an antenna 40 electrically connected to the PCB board 12 through the cable 6, the antenna 40 being proximate the push button switch and/or two-part electrical connector. An application running on the mobile phone 45 communicates with the wireless circuit of the lantern 1 to cycle between illumination modes, apply varying degrees of power to the LEDs 13, based on LED 13 color or not, apply timed programs of illumination modes and/or LED 13 intensities, and the like.

Although any combination of white/green/yellow LEDs, at various intensities, and at various flashing frequencies could be utilized, it has been found that the following combinations are well suited for different types of fishing activities:

| Mode | Frequency | Notes |
| --- | --- | --- |
| White Steady/Green Flashing | 2 hz | |
| Green Steady/Yellow Flashing | 2 hz | |
| White and Green Flashing | 2 hz | 3000 lumens |
| White and Green Flashing | 2.67 hz | 3000 lumens |
| White and Green Flashing | 2 hz | 1,500 lumens |
| White and Yellow | 0 | 1,000 lumens, for non-submerged lantern use |

While a particular form of the invention has been illustrated and described, it will be apparent that various modifications can be made without departing from the spirit and scope of the invention. For example, the light emitting diodes could be incandescent or other bulbs, additional colored LEDs could be included, and varying patterns of LEDs could be included. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A lantern for use on a body of water, the lantern comprising:
    a body having a first and second end, an electrical cable fixed with the first end, a plurality of green LEDs, a plurality of white LEDs, an anchor fixed with the first end, and a float fixed with the second end, the LEDs arranged around the periphery of body;
    a printed computer board controlling power to the plurality of green LEDs and the plurality of white LEDs in a manner to flash the green and white LEDs at a frequency between 1 Hz and 10 Hz at between 40-300 W; and
    a switch device integrated with the electrical cable to activate the printed computer board.

2. The lantern of claim 1 wherein the green LEDs, when powered, produce between 2,000 and 24,000 lumens.

3. The lantern of claim 1 wherein the white LEDs, when powered, produce between 1,000 and 39,000 lumens.

4. The lantern of claim 1 wherein a first part of a two-part electrical connector is fixed to the electrical cable, a second part of the two-part electrical connector being fixed with a power source.

5. The lantern of claim 4 wherein the power source is a pair of battery clips fixable with a conventional 12-volt battery.

6. The lantern of claim 4 wherein the power source is a cigarette lighter plug fixable with a conventional cigarette lighter socket.

7. The lantern of claim 4 wherein the power source is an AC adapter connectable with a 110-240V AC power source.

8. The lantern of claim 4 wherein a switch to activate the illumination means is in proximity to the first part of the two-part electrical connector.

9. The lantern of claim 1 wherein the switch is a wireless circuit adjacent the first part of the two-part electrical connector to allow remote control of the LEDs.

10. The lantern of claim 9 wherein the wireless circuit communicates with a wireless network.

11. The lantern of claim 1 wherein the body is leak sealed using acrylic glue.

* * * * *

UNITED STATES PATENT AND TRADEMARK OFFICE
CERTIFICATE OF CORRECTION

PATENT NO. : 11,147,263 B2
APPLICATION NO. : 15/917751
DATED : October 19, 2021
INVENTOR(S) : Rebecca Noga It is certified that error appears in the above-identified patent and that said Letters Patent is hereby corrected as shown below:

In the Specification

In Column 4, Line 26, delete "while" and insert -- white --, therefor.

Signed and Sealed this
Fourth Day of July, 2023

Katherine Kelly Vidal
*Director of the United States Patent and Trademark Office*